W. H. BURRIDGE.
Potato-Digger.
No. 58,334. Patented Sept. 25, 1866.
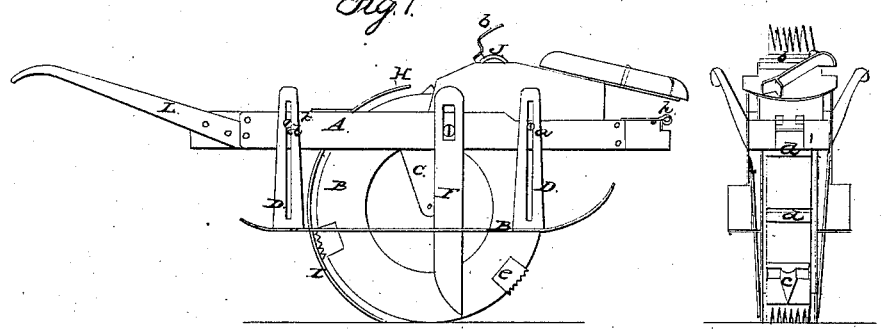
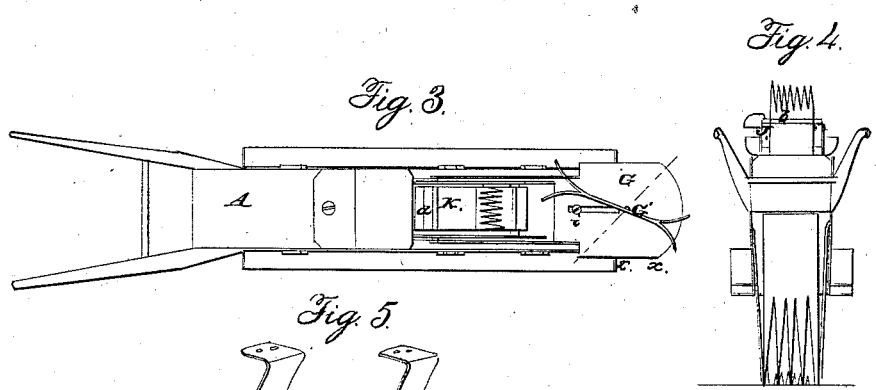
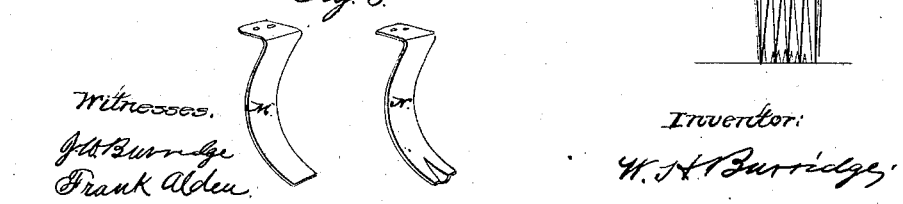

UNITED STATES PATENT OFFICE.

W. H. BURRIDGE, OF CLEVELAND, OHIO, ASSIGNOR TO HENRY CARTER, OF AYLMER, CANADA.

IMPROVEMENT IN POTATO-DIGGERS.

Specification forming part of Letters Patent No. 58,334, dated September 25, 1866.

*To all whom it may concern:*

Be it known that I, W. H. BURRIDGE, of Cleveland, in the county of Cuyahoga and State of Ohio, have invented certain new and useful Improvements in Potato-Diggers; and I do hereby declare that the following is a full, and complete description of the same, reference being had to the accompanying drawings, making a part of this specification, in which—

Figure 1 is a side elevation; Fig. 2, a front-end view; Fig. 3, a top view of the same; Fig. 4, a rear-end view. Figs. 5 are detached sections, to which reference will be made.

Like letters of reference refer to like parts in the several views.

A, Fig. 1, is a frame, which may be constructed of wood or iron, and is mounted upon a large wheel, B. The frame is raised nearly to the top of the wheel by means of the pedestals C, by which it is connected to the wheel. D is a pair of slotted arms, the upper end of which is secured to the frame by the screws $a$, and to the lower end is fixed the shoes E, the purpose of which will be shown hereinafter.

F are cutting-blades or shares. G, Fig. 3, is a table; G', a guide; H, a shield or cover. I is a rake, the use of which will hereinafter be shown. Passing around the wheel B and over a smaller wheel, J, is a belt, K. To this belt is attached a pair of curved forks, $b$, Figs. 1 and 2, also a pair of bill spades or spuds, $c$, and a series of buckets. $d$ $e$ are saw-toothed cutters fixed to the periphery of the sides of the wheel B. These sides project beyond the face of the wheel around which the belt runs the distance of the depth of the forks and spuds referred to, thus forming on each side of the wheel a deep flange, and between which they run—*i. e.*, within the diameter of the sides.

Having thus indicated the several parts of the machine and their arrangement, the following is the manner of operating the same: The machine is placed upon a row of potatoes, the flanges on the wheel B, referred to, being close to the sides of the row. The team is geared to the machine by the hook $h$, and the operator takes his place in the rear, holding and guiding it in its operation by the handles L. As the machine moves forward the flanges, having a sharp-cutting edge, cut into the side of the row. At the same time the fork strikes into the hill and lifts it up and carries it back. So also the rake I is impelled into the ground in the opposite side of the hill at the same instant. By this means the entire hill is lifted up, and, as above said, is carried back and upward around the wheel. The dirt and small potatoes during this movement are sifted out between the prongs of the fork and rake, the shape of the fork being such as to make a sort of basket with the side of the belt when it has passed the hill, and thereby prevents the potatoes from falling out while being carried around to the upper side of the machine to the table G, upon which they fall by the reversing of the position of the fork. A bag is fastened to one side of the table at the point $x$ $x$, into which the potatoes roll, being brought to it by the guide G'. The bag may be hung at either side of the table, as circumstances may make it the most convenient; or the potatoes may be dropped in a row along the ground on either side of the machine by turning the table to the right or to the left, which may be done by loosening the set-screw $i$, Fig. 3, a slot being cut in the table which admits of its being turned sidewise for that purpose, or endwise, as circumstances may render necessary.

This machine may be used for ditching in the following way: The forks and spuds are removed from the belt, leaving only the buckets $d$. The rake I is also removed, and the scraper M, Fig. 5, is then substituted, and the shares F lowered until their point is even with the edge of the sides of the wheel, as shown in Fig. 1. The machine, when thus prepared, is then placed on the line of ditching, the team is geared to it, and the operator takes his place as in the former work. As the machine moves forward the shares cut down the side of the ditch until the buckets reach the ground. They also, being provided with a sharp cutting edge or blades, plow into and take up the dirt and carry it to the table, upon which it is dropped, and from which it slides to the ground along either side of the ditch, the table being turned and the guide arranged for that purpose, in the manner above described. The scraper M in like manner, being sharp-edged, cuts into and gathers up the dirt within range of the buckets, so that they may take it up and convey it to the table, from which it slides to the ground.

The depth of the ditch is regulated and gaged by the shoe E, by raising or lowering the same by the set-screws $k$, according to the depth required.

This machine may also be used for trenching, for the purpose of laying pipe, in the following manner: The spuds are again fixed to the belt, and the scraper I replaced by the section N. This section is formed with a groove and cutting-edge, the groove being the size of the pipe to be laid. The machine is then placed on the line of work, and is operated substantially for this purpose as for that above described. The spuds, on their revolving, plow into the ground, loosening it, so that the section N scrapes it up and brings it within range of the bucket, which, as in the former case, drops it upon the table. The scraper being formed with a groove, as above said, leaves, in consequence, a corresponding groove or channel at the bottom of the work, and in which the pipe may be laid. The depth, also, in this work is regulated by the gage E.

It will be observed that the operation of digging, ditching, and trenching is from below upward. Whereas, the side-cutting by the shares and the shoveling and scraping are in the opposite direction; hence by this means the work is steadily and evenly executed and cleanly finished. The blades or shears F and the toothed cutters $e$ may be removed when ditching and trenching, if thought desirable.

What I claim as my invention, and desire to secure by Letters Patent, is—

1. The rake I, wheel B, provided with flanges and cutters, belt K, and fork $b$, in combination with adjustable table G and guide G', for the purposes and in the manner set forth.

2. The share F, saw-toothed cutters $e$, scraper M, section N, and adjustable guide G', when arranged to operate in the manner and for the purpose described.

3. The wheel B, spuds $c$, scraper M, share F, adjustable table G, and guide G', when arranged in the manner and for the purposes set forth.

W. H. BURRIDGE.

Witnesses:
J. M. ADAMS,
FRANK ALDEN.